United States Patent [19]
Sweeney

[11] Patent Number: 5,209,968
[45] Date of Patent: May 11, 1993

[54] COMPOSITE STRUCTURE WITH WASTE PLASTIC CORE AND METHOD OF MAKING SAME

[75] Inventor: Jeff S. Sweeney, Conyers, Ga.

[73] Assignee: Diversitech Corporation, Conyers, Ga.

[21] Appl. No.: 733,632

[22] Filed: Jul. 22, 1991

[51] Int. Cl.⁵ .................. B32B 5/16; B32B 5/24; B32B 13/02; F16M 5/00

[52] U.S. Cl. .................. 428/312.4; 52/586; 52/588; 52/805; 248/679; 264/69; 264/257; 264/271.1; 428/70; 428/188; 428/193; 428/339; 428/703

[58] Field of Search .................. 428/312.4, 703, 339; 264/69, 257, 271.1; 248/679

[56] References Cited

U.S. PATENT DOCUMENTS

| | | |
|---|---|---|
| 3,745,058 | 7/1973 | Poymal . |
| 4,411,723 | 10/1983 | Takeuchi .................. 428/703 |
| 4,572,861 | 2/1986 | Garcia .................. 428/703 |
| 4,617,219 | 10/1986 | Schupack .................. 428/703 |
| 4,693,924 | 9/1987 | Kuper et al. .................. 428/703 |
| 4,752,538 | 6/1988 | Bounini .................. 428/703 |
| 4,778,718 | 10/1988 | Nicholls .................. 428/703 |
| 4,876,151 | 10/1989 | Eichen .................. 428/703 |
| 4,904,510 | 2/1990 | Noth et al. .................. 428/703 |
| 5,030,502 | 7/1991 | Teare .................. 428/703 |

Primary Examiner—James C. Cannon
Attorney, Agent, or Firm—Jacobson, Price, Holman & Stern

[57] ABSTRACT

A low cost, lightweight, high strength, long lasting, crack resistant, monolithically formed composite structural material and the method of making the same in which the composite consists of a core constructed from lightweight, granulated scrap or waste plastic bonded together with a cementitious slurry binder. The core is covered on one or more of its sides with a high strength outer layer constructed of layers of non-woven fabric material impregnated with the same cementitous slurry binder with the fibers in the layers of non-woven fabric material forming a three-dimensional reinforcement matrix for the cementitous slurry. The composite of the core and covering is co-formed and cured monolithically with the cementitious slurry being continuous throughout the fibers of the layers of non-woven fabric and the core with the lightweight scrap or waste plastic serving as an aggregate for the core. The composite structural material can be molded or formed in various shapes and configurations for various purposes.

8 Claims, 1 Drawing Sheet

COMPOSITE STRUCTURE WITH WASTE PLASTIC CORE AND METHOD OF MAKING SAME

BACKGROUND OF THE INVENTION

1. Field of Invention

The present invention generally relates to a composite structural material and the method of making the same and more specifically the invention relates to a low cost, lightweight, high strength, long lasting, crack resistant, monolithically formed composite structural material and the method of making the same in which the composite consists of a core constructed from lightweight, granulated scrap or waste plastic bonded together with a cementitious slurry binder. The core is covered on one or more of its surfaces with a high strength outer layer constructed of layers of non-woven fabric material impregnated with the same cementitous slurry binder with the fibers in the layers of non-woven fabric material forming a three-dimensional reinforcement matrix for the cementitous slurry. The composite of the core and outer layer are co-formed and cured monolithically with the cementitious slurry being continuous throughout the fibers of the layers of non-woven fabric and the core with the lightweight scrap or waste plastic serving as an aggregate for the core. The composite structural material can be molded or formed in various shapes and configurations for various purposes.

2. Description of the Prior Art

Various types of composite structural materials are well known and have been utilized for various purposes in forming a desired structural entity. Composite structural materials are frequently formed into panels which include a lightweight core material surrounded by or partially surrounded by an outer layer of high strength material. The core usually provides lightweight characteristics and insulating properties and the outer layer provides strength, durability, fire resistance and in some instances, appearance characteristics. Various procedures have been developed for forming the core and applying an outer skin, layer or coating of various material to the pre-formed core.

Prior U.S. Pat. No. 4,505,449 issued Mar. 19, 1985 and commonly owned with the present invention discloses a base having a lightweight foam core and a coating of cementitous material covering portions of the core. U.S. Pat. No. 4,303,722 discloses a panel constructed by bonding inorganic fiber webs to a pre-formed foam panel utilizing a mixture of thermosetting polymer and gypsum. U.S. Pat. No. 4,559,263 discloses the concept of binding a layer of concrete to a pre-formed board of foamed plastic resin to form a roofing panel. U.S. Pat. No. 4,617,219 discloses a reinforced cement structure utilizing non-woven fabric reinforcing material encapsulated in a cementitous composition. U.S. Pat. No. 4,778,718 discloses a panel having a cementitious matrix reinforced with a three-dimensional fabric distributed uniformly throughout the thickness of the panel. U.S. Pat. No. 4,894,270 discloses a folded structure of polymer fabric reinforced cementitious materials. U.S. Pat. No. 4,963,408 discloses a panel in which a pre-formed core is encapsulated with an outer layer consisting of a polymer and load bearing reinforcing filaments.

The above patents and the prior art cited in those patents and the following U.S. patents are relevant to this invention.

U.S. Pat. No. 4,050,659
U.S. Pat. No. 4,056,251
U.S. Pat. No. 4,305,508
U.S. Pat. No. 4,436,274
U.S. Pat. No. 4,714,715
U.S. Pat. No. 4,764,238
U.S. Pat. No. 4,876,151

While the above prior patents disclose various composite structures they do not disclose the specific arrangement of a core formed of scrap or waste plastic and a cementitious slurry binder together with an outer cover formed of layers of non-woven fabric material and a cementitious slurry which is the same slurry as used as a binder for the core with the components of the composite being co-formed and monolithically formed and cured.

SUMMARY OF THE INVENTION

An object of the present invention is to provide a composite structural material and a method of its manufacture to provide a high strength, lightweight and low cost structural material having high ductility and toughness with the composite structural material consisting of a core material and an outer layer on one or more surfaces of the core.

Another object of the invention is to provide a composite structural material as set forth in the preceding object in which the core is constructed of lightweight plastic aggregate in the form of comminuted waste plastic material such as industrial and post-consumer waste expanded polystyrene combined with a cementitious slurry and the outer layer is in the form of a fibrous reinforcement constructed of a non-woven web of fibrous material such as polypropelene fibers with a fiber volume loading of 3–20%. The core material is an ultra-lightweight concrete made with cementitious slurry binder and lightweight granular plastic as an aggregate. The core and outer layer or layers are made with the same cementitious slurry and are co-formed and cured monolithically to create the composite structural material.

A further object of the invention is to provide a composite structural material in accordance with the preceding objects which effectively fulfills the requirements of high strength and toughness/ductility, lightweight, low permeability, insulative ability, fire resistance, low cost and provided with a long life expectancy.

These together with other objects and advantage which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
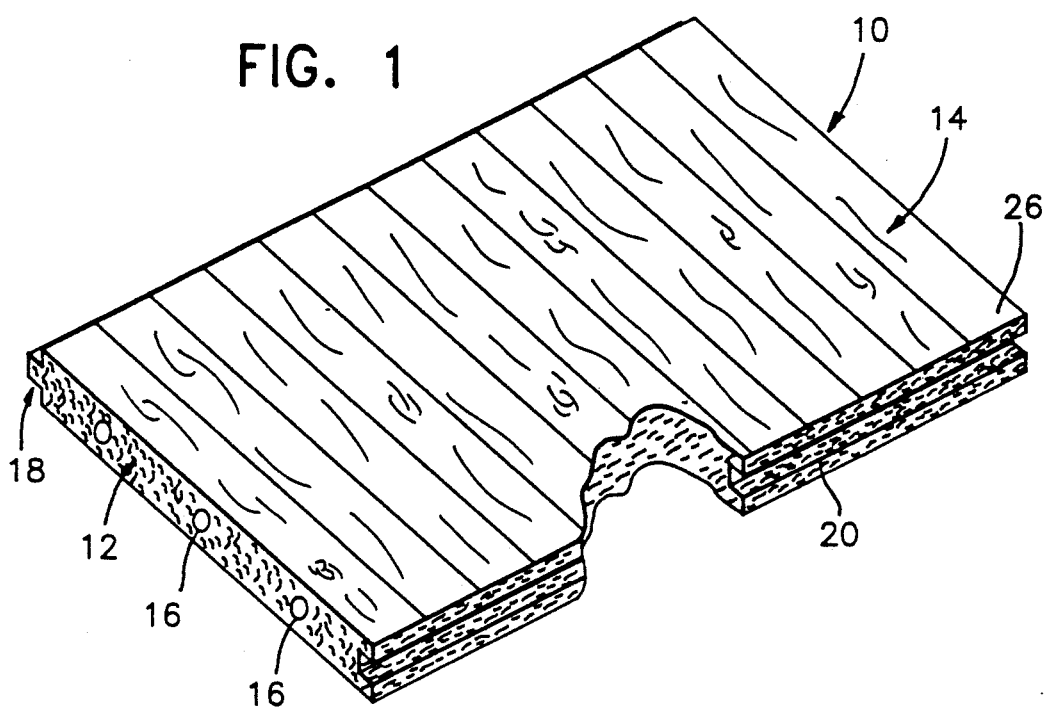
FIG. 1 is a perspective view of a panel or pad utilizing the composite structural material of the present invention.

Referring now specifically to the drawings, a composite structural component in the form of a panel or pad is illustrated in FIG. 1 and generally designated by reference numeral 10 and which includes a core generally designated by reference numeral 12 and an outer layer generally designated by reference numeral 14 which may extend over one surface of the panel, both opposed surfaces or around all of the edges and all of the surfaces. The core 12 may include passageways, conduit, piping, wiring or the like incorporated therein as indicated by reference numeral 16. Opposed edges may be provided with connecting and aligning members such as a tongue 18 and groove 20 which may be on only two opposite sides or on all four sides. The outer covers or layers 14 form the interior and exterior surfaces of the panel and they can be textured or colored when being formed or finished with various materials such as plastic, sheathing, painting, grooving or the like for appearance purposes to enable any desired architectural finish characteristics to be obtained.

Figure 2:
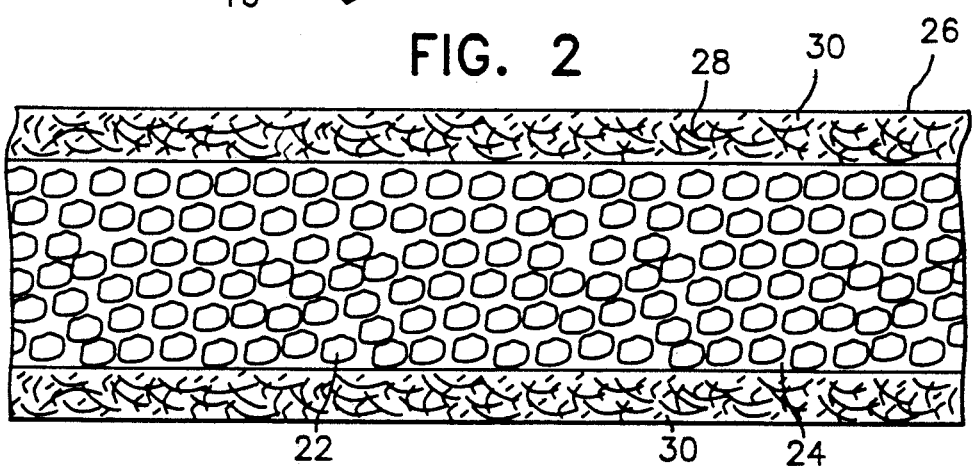
FIG. 2 is a sectional view, on an enlarged scale, illustrating the specific arrangement of the components forming the composite structural material of this invention.
Figure 3:
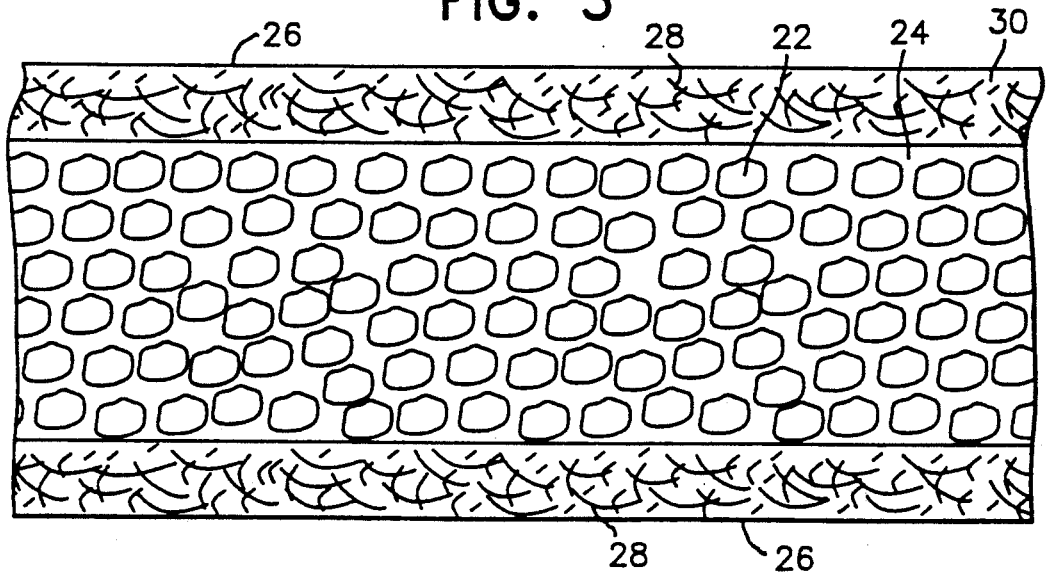
FIG. 3 is a fragmental sectional view, on a scale larger than FIG. 2, illustrating the relationship of the aggregate and the core, the fibers of the cover and the slurry binder.

As illustrated in FIG. 2 as well as FIG. 3, the core is constructed of granulated or comminuted waste plastic material such as expanded polystyrene which constitutes the aggregate in the core with the aggregate having a cementitious slurry binder 24 intimately surrounding and interconnecting the aggregate into a rigid form when cured.

The outer cover or layer 14 includes a three-dimensional web of non-woven fabric 26 which includes non-woven fibers 28 with a cementitious slurry binder 30 intimately surrounding and connecting the fibers 28 when the cementitious slurry binder is cured. The cementitious slurry binder 24 in the core and the cementitious slurry binder 30 in the outer layer or cover are the same and the core and outer layer components are co-formed and monolithically cured with the cured and hardened slurry binders 24 and 30 becoming a monolithic body thus providing an ultra lightweight core which is reinforced and rigidified by the outer layer or layers with the core and layer or layers being rigidly formed into a monolithic unit.

In one embodiment of the invention, a load bearing wall panel, 8′ long×4′ wide×2½″ thick, was formed in accordance with the present invention. A cement slurry was mixed in a portable mortar mixer with a total of 250 pounds of cement slurry being formed with the following ratios by weight: 10 parts Portland cement, 5 parts fine sand, 1 part microsilica, 4 parts water and 0.1 parts water reducing superplasticizer. Four sheets of a non-woven web material in the form of a needlepunched polypropelene weighing 8 ounces per sq. yd. with a loft of ¼″ were cut into 4′×8′ pieces. Two pieces of the non-woven web material were placed in a shallow 10′×5′ pan and were saturated with 50 pounds of the cement slurry. The pan was vibrated and the slurry screeded uniformly into the fiber matrix. The slurry saturated pieces of non-woven fabric were placed in the bottom of an 8′×4′ by 2 1/1″ deep mold which had been treated with a suitable form-release agent.

One hundred and fifty pounds of the slurry was mixed with 5 cu. ft. of expanded polystyrene beads derived by hammermilling pieces of waste expanded polystyrene board to form 6 cu. ft. of an ultra-lightweight concrete with a density of 25 pounds per cu. ft. Then, 5 cu. ft. of the ultra-lightweight core mixture was deposited into the mold on top of the slurry saturated pieces of non-woven fabric forming the outer layer or cover and vibrated and screeded level with the top of the mold. The other two pieces of non-woven fabric were saturated with the remaining 50 pounds of the slurry in a manner identical to the previous non-woven pieces and this layer of slurry saturated non-woven pieces was placed on top of the ultra-lightweight in the mold. A 10′×5′ flat plate was then applied to bear against the top saturated non-woven layer with sufficient force to compress the composite mixture to the 2½″ mold height. The entire mold was vibrated externally during this compression to consolidate the ultra-lightweight concrete core and evenly distribute the cement slurry binder throughout both the core and the outer layer or layers. The flat plate was then removed and the composite material was left to cure monolithically in the mold for 24 hours.

After 24 hours, the composite panel was demolded and the resulting 8′×4′×2½″ thick panel weighed approximately 7 pounds per sq. ft. The core is approximately 1¾″ thick and each outer layer is approximately ⅜″ thick. Test beams were cut from the panel with the test beams being 24″ in length, 6″ wide and 2½″ thick. These test beams were tested for flexural strength after a 28 day curing period by using 3rd point loading on an 18″ span. This flexural strength is approximately equivalent to prior art panels when constructed to be 6″ thick and weigh approximately 40 pounds per sq. ft. The core is preferably about 4 parts aggregate by 1 part slurry with the slurry including, by weight, 10 parts Portland cement, 5 parts fine sand, 1 part microsilica, 2½ to 6 parts water, and 0 to 0.5 super-plasticizer. The fiber volume in the outer covers or layers may range between 3 and 20% and the bead size of the expanded polystyrene may range from 1/16″ to ¼″ of nominal size.

This arrangement provides a smooth external appearance to the panel and outer layers inasmuch as the engagement of the slurry with the smooth surfaces of the mold completely encapsulates and conceals the fibers forming the non-woven fabric.

The use of waste expanded polystyrene in making a composite structural material removes a non-biodegradable material from the environment and provides a relatively low cost panel, pad or other structural entity which can find many uses in building and other arts. The lightweight, low cost, insulative, fire resistant and environmentally advantageous structure enables the composite material to be used as a supporting base or pad for various machinery, building panels and the like.

Panels and other structural entities constructed in accordance with this invention overcome various problems which exist with respect to existing panels. Preformed foam cores in the prior art are relatively expensive and frequently are the most costly component of the panel. Also, significant trade-offs are involved with the choice of the materials to be used in the outer layer of the laminate. Concrete and gypsum used in the prior art possess relatively low flexural strengths and thus must be either applied in thicker sections resulting in greater weight or in conjunction with polymers resulting in higher cost. Fabric reinforced resins and polymers used as outer layers result in higher cost and less fire resistance than cementitious materials. Also, outer layers bonded to a pre-formed core can have a problem of delamination. Further, separate bonding agents and relatively complicated manufacturing methods which usually must be employed to prevent delamination under structural loading increase the cost of the panels. Panels which are made with concrete outer layers are prone to cracking and brittle failure behavior unless reinforced with steel or high tensile strength materials to control crack formation which of course increases the cost of materials and labor in forming the panel and when steel reinforcement is used, the panel may be subject to rust and corrosion.

As compared with the prior art, the high strength of the structural material o panels of the present invention result from the outer layer and the core material being co-formed and monolithically formed and cured to provide a monolithic construction of the composite. The outer layer possesses the look and durability of ordinary concrete but has significantly enhanced flexural strength due to the amount and three-dimension orientation of the reinforcing fibers. The cement and lightweight aggregate core has a much higher compressive strength than typical densities of pre-formed foam used in the prior art. Also, inasmuch as the core and outer layer or layers are formed as one unit with the cementitious slurry binder continuous throughout, there exists no plane of weakness for delamination to occur.

The relatively lightweight of the composite of this invention is due to both the use of ground or comminuted foam plastic as an aggregate in the core and the high flexural strength and crack resistance of the outer layer or layers. The superior properties of the outer layer provide for the design of thinner sections to achieve the desired strength as compared to the prior art. Further, the lightweight of the composite allows panels or sections of the material to be prefabricated in a controlled environment and economically shipped to remote locations to be installed.

The structural material or entity of the present invention includes low permeability and fire resistance characteristics which are functions of both the outer layer and the core material. The outer layer will provide essentially the same fire resistance and water penetration resistance as ordinary concrete. Further, the expanded polystyrene in the core material is completely surrounded with cement slurry which is an advantage over the prior art where the pre-formed foam plastic is vulnerable to fire or water which may penetrate the outer layer due to surface defects or construction techniques.

The composite material or structural entity of this invention has also a low manufacturing cost primarily due to the materials and simple procedures used in its manufacture. The entire composite is formed of non-woven fiber webs, recycled waste expanded polystyrene, hydraulic cement, water and aggregate admixtures as desired to obtain certain textures that are formed and cured at the same time as the cementitious slurry, less labor and simpler equipment and facilities are utilized as compared to prior art.

The composite of the present invention can be used in many building orientations where panels, supporting pads, bases and the like are presently used. For example, composite wall panels, floor panels for various purposes including supporting computer and electronic units, roofing and ceiling panels, noise-abating or sound-attenuating panels and surfaces, fire resistant insulation, ultra-lightweight concrete having insulating characteristics, buoyant structural supports or components including floating docks and the like. Many other uses of the composite material also exist in which the lightweight, low cost, high strength, fire resistant, insulative, high toughness and ductility characteristics are beneficial.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A composite structural material comprising a core constructed of lightweight particles mixed with a cementitious slurry binder, an outer layer constructed of the same cementitious slurry binder reinforced with fibers, said core and outer layer being co-formed and cured monolithically with the same cementitious slurry binder forming a rigid matrix extending substantially continuously throughout the composite material to form a lightweight, low cost, high strength, insulative, fire resistant composite material having high toughness and ductility properties.

2. The composite material of claim 1 wherein the lightweight particles in the core are particles of expanded polystyrene derived by comminuting post-consumer and industrial waste or scrap expanded polystyrene.

3. The composite material of claim 2 wherein the expanded polystyrene is in the form of beads having a maximum dimension between 1/16" and ¼".

4. The composite material of claim 1 wherein the reinforcing fibers of the outer layer is in the form of a non-woven web.

5. The composite material of claim 1 wherein the core has two outer layers co-formed on two sides of a planar core to form a sandwich panel.

6. The composite material as defined in claim 2 wherein the reinforcing fibers of the outer layer is in the form of a non-woven web.

7. The method of making a composite material consisting of the steps of placing at least one layer of non-woven web fabric material into a shallow mold, placing a cementitious slurry binder containing Portland cement, aggregate water and admixtures into the mold, vibrating the mold and screeding the binder to impregnate the non-woven web material with the binder, placing a mixture of waste expanded polystyrene particles and the same cementitious slurry binder into the mold, vibrating and screeding the waste expanded polystyrene and cementitious slurry binder mixture to a level with the top edge of the mold to co-form the cementitious slurry binder, the non-woven web material and expanded polystyrene particles and placing a plate on the top of the mold to compress the materials therein and monolithically curing the materials in the mold to form a panel.

8. The method as defined in claim 7 together the step of saturating an additional layer of non-woven web material with the same cementitious slurry binder and placing it across the top of the mold prior to placement of the top plate thereon to form a panel having a layer of non-woven we material and cementitious slurry binder on opposed surfaces of the composite material.

* * * * *